United States Patent [19]
Galle

[11] 3,783,164
[45] Jan. 1, 1974

[54] PROCESS FOR PRODUCING MILLED STABILIZED WHEAT GERM
[75] Inventor: Edward L. Galle, St. Paul, Minn.
[73] Assignee: The Pillsbury Company, Minneapolis, Minn.
[22] Filed: Sept. 12, 1968
[21] Appl. No.: 760,745

[52] U.S. Cl. ........................................... 426/312
[51] Int. Cl. .............................................. A23l 1/10
[58] Field of Search ...................... 99/80, 80 G, 153

[56] References Cited
UNITED STATES PATENTS
2,085,421   6/1937   Donk et al. .............................. 99/83
3,036,919   5/1962   Kretschmer et al. ................... 99/80

FOREIGN PATENTS OR APPLICATIONS
332,847   7/1930   Great Britain ...................... 99/80 G Primary Examiner—Raymond N. Jones
Attorney—Ronald E. Lund, James V. Harmon and M. Paul Hendrickson

[57] ABSTRACT

Wheat germ is recovered from conventionally milled wheat. The germ is ground in an impact mill such as the Hurricane Pulverizer, Raymond Mill or Pulvocron. The ground germ is heated to about 200° F. while suspended in air either by introducing hot air into the grinder inlet or by expelling the ground germ into a stream of hot air (about 600 cubic feet of 300° F. air per pound of germ). The ground germ dried to less than 6 percent moisture content is then collected in a cyclone and preferably sifted to remove bran particles from the powdered product.

5 Claims, 3 Drawing Figures

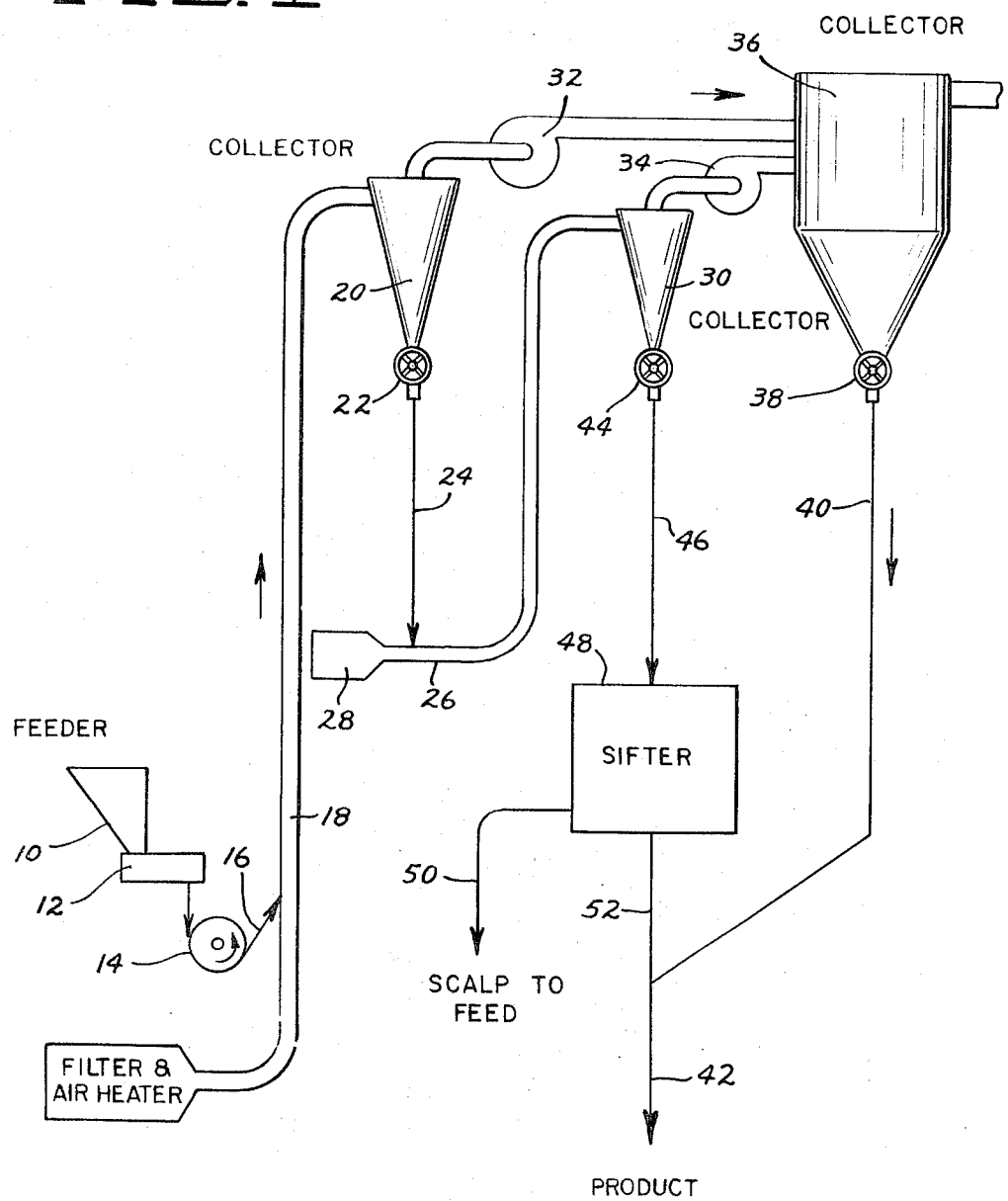

FIG. 2

MILL WHEAT CONVENTIONALLY
↓
RECOVER WHEAT GERM
↓
GRIND WHEAT GERM IN IMPACT MILL SUCH AS THE HURRICANE PULVERIZER, RAYMOND MILL OR PULVOCRON.
↓
INTRODUCE HOT AIR INTO GRINDER INLET OR ALTERNATIVELY INTRODUCE GROUND GERM INTO A HOT AIR STREAM FOR DRYING (100 CUBIC FEET OF 300°F. AIR PER POUND OF GERM.)
↓
SEPARATE GROUND DRIED GERM FROM THE DRYING AIR IN CYCLONE COLLECTOR AND OR FILTER COLLECTOR.
↓
OPTIONALLY SIFT GROUND DRIED GERM FOR REMOVAL OF BRAN PARTICLES THEREBY PROVIDING A STABLE DRY PRODUCT WITH MOISTURE CONTENT OF LESS THAN 6%.

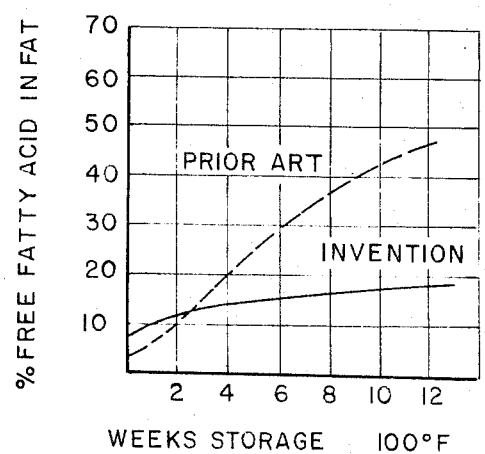

FIG. 3

PROCESS FOR PRODUCING MILLED STABILIZED WHEAT GERM

The present invention relates to food products derived from grain and more particularly to a ground wheat germ product having improved resistance to deterioration in storage.

Wheat germ that is obtained from conventional milling operations is unstable during storage and is subject to rapid deterioration primarily due to rancidity of the oil contained in the product. As rancidity becomes more pronounced, the product becomes less appetizing and finally unpalatable.

The common practice today is to reduce the development of rancidity by toasting the wheat germ in a radiant heat oven to the point at which it begins to turn brown. The germ is ordinarily allowed to turn from a yellow color to a ligh brown. This heat treatment sterilizes the germ, inactivates lipase and develops a toasted flavor but because it does not reduce oxidative rancidity, it is still necessary to pack the finished wheat germ in vacuumized containers to prevent oxidative degradation. This process has certain shortcomings. One of the most important is the fact that some of the vitamins contained in what germ are heat sensitive and are destroyed during the toasting operation. Thus, for example, toasting normally causes very substantial reductions in thiamine content. A reduction of about 40 percent is not unusual. Toasting also denatures the natural protein in the wheat germ and thus prevents its use where the functional properties of the protein are required, such as in forming stable emulsions.

It has been previously proposed to prepare stabilized wheat germ by grinding fresh what germ and thereafter heating the ground germ in a container not having free access to air or alternatively in a current of inert gas to thoroughly dry it. However, it was necessary to mix with the wheat germ a small amount of salt and a relatively large amount of filler such as potato flour before it was heated. This product is unsatisfactory for many purposes because it cannot, of course, be marketed as wheat germ due to the high flour content. Moreover, it is necessary to package the product in air tight containers while still warm.

In view of the deficiencies of the prior art, the present invention has the following objects and advantages: (a) the provision of a proces for stabilizing wheat germ that will not destroy the hydrophilic film forming properties of the wheat germ so that it retains the capacity of forming stable emulsions; (b) producing a product having much greater resistance to rancidity than untreated wheat germ; (c) a process for producing stable wheat germ having the above-noted characteristics which will not turn the germ brown during treatment; (d) the ability to produce a product having sufficient stability to withstand shipment and storage in unevacuated containers in the absence of adulterating materials.

These and other more detailed and specific objects will become apparent from the following description of the invention and drawings wherein:

FIG. 1 is a schematic flow diagram of one form of apparatus for performing the process according to the invention.

FIG. 2 is a flow chart of the process.

FIG. 3 is a graph illustrating the resistance to rancidity of untreated wheat germ and products prepared in accordance with the invention during storage at 100°F. for 12 weeks.

The invention will now be described with reference to FIG. 1. Wheat germ is recovered conventionally from milled wheat by selective grinding and purification. The wheat germ is then ground by impact milling. It is important that the impact milling be employed rather than roll milling or similar processes wherein the particles are pressed between adjacent roll surfaces because its high oil content interferes with effective grinding. Impact grinding as employed herein is defined as any form of grinding operation in which the particles are propelled so as to be broken by impaction against a surface or other particles. Any of a variety of impact mills known to the art can be employed such as the Hurricane Pulverizer made by The Pillsbury Company, Minneapolis, Minn.; the Raymond Mill made by the Raymond Division of Combustion Engineering Co., Chicago, Ill. or the Pulvocron made by Strong-Scott Mfg. Co., Minneapolis, Minn. In the milling operation the wheat germ should be reduced to the maximum particle size of less than 30 and preferably less than 40 U.S. Standard Mesh screen size. The bran which is usually found with wheat germ remains rather coarse and can be scalped off because of its much larger particle size.

Particle size of the wheat germ is not regarded as being critical. It is usually desirable to grind it sufficiently so that the wheat germ may be readily separated from bran by sifting. A relatively small particle size such as 70 U.S. Standard screen size is preferred when the product is to meet U.S. Department of Agriculture flour standards.

Drying of the product can be accomplished in two ways. The first method is to introduce hot air into the impact mill with the wheat germ whereby the wheat germ is simultaneously ground and heated. If this method is employed, air at a temperature of between about 150° and 500° F. but preferably about 300° F. is introduced to the grinder inlet with the wheat germ.

It is important to note that the exposure to atmospheric oxygen is maximized during the heating operation since the particles are in a highly agitated air suspended condition during their exposure. Thus, while the reason for the effectiveness of the invention is not known with certainty, it is believed to be at least partially due to the relatively brief but thorough exposure of the particles to heat in a highly turbulent air suspended condition. The period of exposure to heated air is ordinarily for only a few seconds, for example less than 5 seconds. However, if the particles are allowed to remain at an elevated temperature for a few minutes this will not be harmful.

The second method of drying will now be described. In this method hot air is not introduced to the grinder as described above. Instead, the ground material is expelled from the grinder directly into a moving current of hot air such as a stream of hot air rising within a duct. The influent particles are swept along with and agitated by the swirling current of rising hot air and are carried with the air to a collection station. Regardless of which drying method is employed, the finished particles should have a moisture content that has been reduced from above 10 percent by weight to less than 8 percent by weight but preferably less than 6 percent by weight.

As explained above in connection with the first described drying method, the air temperature can be from about 150°F. to about 500°F. The air must be sufficiently dry to accept moisture from the suspended particles. Air at about 300°F. is satisfactory.

Whichever form of heating is employed, the particles themselves remain in the air stream for a period of about one-half to 1 second and usuallly less than about 5 seconds at which point the particles are collected. At the point of collection the particle temperature will be about 200° F. The temperature of the particles themselves is critical in that it must be less than the temperature that will cause protein denaturation. A final particle temperature of between about 150° – 250° F. has been found satisfactory.

As soon as the particles are collected they are cooled as by transferring them to a cool air stream, e.g. air at a temperature of 70° F. The collected particles are then preferably sifted to scalp off bran. The product is unadulterated by additives and will form stable emulsions. The reason stable emulsions can be formed is believed to be due in large part to the fact that proteins have not been denatured. The product is resistant to rancidity during storage although air is present in storage containers as seen by reference to FIG. 3. By inspection of FIG. 3, it will be noted that the free fatty acid content after storage for 12 weeks at 100° F. is only about 18 percent by weight of the fat present whereas about 47½ percent of the fat present has been converted to free fatty acids in untreated germ.

Refer now to FIG. 1 which illustrates one example of the invention. Wheat germ is introduced from a hopper 10 to a screw auger 12 which introduces the wheat germ at an even rate (about 200 – 250 lbs./hr.) into a Hurricane Pulverizer 14 that discharges the product through a duct 16 into a duct 18 containing a rising current of air flowing at the rate of 2,500 cfm. and heated to a temperature of 300° F. to a hot collector 20. Material received in the collector 20 is passed through a star valve 22 and duct 24 to a cool air supply duct 26 into which ambient air of about 70°F. is drawn through a filter 28. The collected material is swept upwardly with the cool air stream through duct 26 to a cool collector 30. Air is withdrawn from collectors 20 and 30 by fans 32 and 34 respectively and is fed to a filter bag collector 36 of any suitable or well-known construction. The material collected within collector 36 is allowed to pass through valve 38 and line 40 to a final collection point 42. Material received by the collector 30 passes through a valve 44 and line 46 to a sifter 48. Bran is removed at 50. The remaining material passes to the collection point 42 through a line 52. The moisture content is less than 8 percent by weight.

The effectiveness of the invention in preserving the original vitamin content of the wheat germ is illustrated in Table 1 below. By reference to the table it will be seen that wheat germ prepared in accordance with the invention contains 10.36 milligrams of thiamine per lb. whereas millrun wheat germ and wheat germ that has been toasted in an oven until brown contains 8.16 and 7 to 8 milligrams of thiamine per lb. respectively. Vitamins other than those listed in the table were present in about the same amount as in the starting material.

TABLE 1

| | Oven Toasted Wheat Germ (browned) Thiamine mg/lb. 7 to 8 | Invention 10.36 | Millrun Wheat Germ 8.16 |
|---|---|---|---|

Furthermore, inactivation of enzymes was demonstrated by a reduction in $\alpha$ amylase of from 0.1390 units/gram to 0.0530 units/gram when treated as described with air at 300° F. (elevating product temperature to 175°F.) and to 0.0256 units/gram when treated with air at 375°F. (bringing the product to a temperature of 200°F.). The oxidase content of the germ was also reduced substantially.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A process for preparing a stable wheat germ product comprising subjecting wheat germ to impact grinding until the wheat germ has been reduced to particles having a maximum size of about 30 mesh U.S. Standard screen size, briefly suspending the particles in a turbulent oxygen containing atmosphere having a temperature sufficient to raise the temperature of the wheat germ to about at least 150°F., said atmosphere being sufficiently dry to accept moisture from the wheat germ whereby wheat germ is dried to a moisture content not exceeding 8 percent.

2. The process of claim 1 wherein the said wheat germ is exposed to said heated dry atmosphere while being subjected to said impact grinding whereby the wheat germ is dried as it is ground.

3. The process of claim 1 wherein the wheat germ is first subjected to said impact grinding and is then immediately transferred to an atmosphere of hot air at a temperature about at least 150° F. for a period of about 2 seconds and is then cooled to room temperature.

4. The process of claim 1 wherein the ground dried germ is sifted for removal of bran particles after being exposed to said heated atmosphere.

5. A process for forming a ground what germ product having improved rancidity resistance during storage comprising continuously feeding a substance consisting essentially of wheat germ at a uniform rate to a grinder, comminuting said substance by impact grinding until the maximum particle size is less than about 40 US standard screen size, suspending the ground particles of said substance in air heated to a temperature of about 150° F. to about 500° F. to dry the particles until they have reached a moisture content of less than about 6 percent by weight and a temperature of about 150° F. to about 250° F. and subjecting the particles of said substance to agitation while suspended in heated air thereby providing a finished product which is resistant to rancidity that consists essentially of wheat germ.

* * * * *